(12) United States Patent
Kim

(10) Patent No.: US 6,173,188 B1
(45) Date of Patent: Jan. 9, 2001

(54) METHOD OF A FORWARD POWER CONTROL USING AN ERASURE INDICATOR BIT

(75) Inventor: Wan-Ho Kim, Seocho-gu (KR)

(73) Assignee: Samsung Electronics Co., Ltd. (KR)

( * ) Notice: Under 35 U.S.C. 154(b), the term of this patent shall be extended for 0 days.

(21) Appl. No.: 09/108,101

(22) Filed: Jun. 30, 1998

(30) Foreign Application Priority Data

Jun. 30, 1997 (KR) .................................. 97-29573

(51) Int. Cl.⁷ .............................. H04Q 7/20; H04B 7/00
(52) U.S. Cl. ...................... 455/522; 455/239.1; 455/69
(58) Field of Search .................... 455/423, 522, 455/561, 562, 69, 126, 127, 524, 504, 505, 38.3, 68, 232.1, 234.1, 235.1, 239.1; 375/130, 1, 153

(56) References Cited

U.S. PATENT DOCUMENTS

| | | |
|---|---|---|
| 4,777,653 * | 10/1988 | Bonnerot et al. ...................... 455/69 |
| 4,780,855 | 10/1988 | Iida et al. ......................... 365/185.22 |
| 5,461,639 * | 10/1995 | Wheatley, III et al. .............. 370/342 |
| 5,517,453 | 5/1996 | Strain et al. ...................... 365/185.12 |
| 5,852,782 * | 12/1998 | Komatsu ............................... 455/522 |
| 5,884,187 * | 3/1999 | Ziv et al. ............................. 455/522 |
| 5,893,035 * | 4/1999 | Chen ................................. 455/522 |
| 5,896,411 * | 4/1999 | Ali et al. ............................. 375/130 |
| 5,933,782 * | 8/1999 | Nakano et al. ..................... 455/522 |
| 5,943,610 * | 8/1999 | Endo ................................. 455/69 |
| 5,960,361 * | 9/1999 | Chen ................................. 455/522 |

\* cited by examiner

Primary Examiner—Dwayne D. Bost
Assistant Examiner—Charles Craver
(74) Attorney, Agent, or Firm—Dilworth & Barrese, LLP.

(57) ABSTRACT

A method for performing forward power control in a code division multiple access (CDMA) cellular communication system includes initializing and starting the forward power control. Additionally, a forward link transmission gain of a power transmitted from a base station to a mobile station is adjusted based on a value of an erasure indicator bit contained in a reverse traffic frame transmitted in a reverse traffic channel from the mobile station.

16 Claims, 3 Drawing Sheets

METHOD OF A FORWARD POWER CONTROL USING AN ERASURE INDICATOR BIT

FIELD OF THE INVENTION

The present invention relates to power control in cellular communication systems and, more particularly, to a method for performing forward power control in a Code Division Multiple Access (hereinafter "CDMA") cellular communication system.

DESCRIPTION OF THE RELATED ART

A CDMA cellular communication system consists of numerous Base station Transceiver Subsystems (BTS) which provide service to mobile stations, and also a Base Station Controller (BSC), a Base Station Manager system (BSM), a Mobile Switching Center (MSC) and a Location Registering System.

The area in which each base station provides cellular service is referred to as a cell. A cell is divided into several sectors. In ascending order, the coverage of a cell is expanded into a BTS area, a BSC area and a MSC area.

As is known, cellular communication systems consist of forward and reverse communication channels. A forward communication channel is a channel that is formed from a base station to a mobile station, and includes a pilot channel, an optional synchronization channel, an optional paging channel, and several forward traffic channels for transmitting voice or data. A reverse communication channel is a channel that is formed from a mobile station to a base station, and includes a primary traffic channel, a secondary traffic channel and a signaling channel.

In a CDMA system, many subscribers access the same frequency band at the same time. Therefore, in order to increase subscriber capacity, the signal power of interference signals should be minimized.

Thus, one way to increase subscriber capacity is through power control. There are two types of power control, forward power control and reverse power control. Reverse power control refers to a method for equalizing the power transmitted to a base station from all its corresponding mobile stations. Reverse power control may be required when interference is present as a result of signals or noise originating from other base stations. Further, the near-far problem and cell-outside interference can be minimized through reverse power control.

On the other hand, forward power control, which is performed in a transceiver selector bank of a base station, refers to a method for increasing or decreasing the power transmitted from a base station to a mobile station in order to maintain regular speech quality for all channels. The method is generally performed when, during a conversation, a mobile station moves toward cell boundaries where multipath propagation phenomena, noise or interference are severe. Further, forward power control can generally reduce interference signals resulting from "neighboring" cells in the radio environment.

A mobile station reports a Frame Error Rate (FER) to a base station every reporting cycle or whenever the FER is less than a threshold value. The FER is the number of bad (i.e., error) frames. The mobile station reports the FER, which is indicative of the forward link quality, to the base station in a pilot measurement report message. The base station, after receiving the pilot measurement report message from the mobile station, controls its transmitting power by adjusting the transmission gain of the forward link.

FIG. 1 is a signal flow diagram illustrating a method for performing forward power control according to the prior art. As stated above, the conventional method is performed by a transceiver selector bank in a base station. According to the method, a mobile station receives/transmits messages from/to a call control processor through a channel element and a transceiver selector bank.

The call control processor sends a call assign message to the transceiver selector bank, which then prepares to establish a traffic channel by exchanging time synchronization data with the channel element. The mobile station then informs the channel element of the start of a traffic channel by transmitting null traffic. Once the traffic channel has started, the transceiver selector bank initializes forward power control (step 110).

Upon receiving a mobile acquisition message from the channel element, the transceiver selector bank waits for a pilot measurement report message to be sent from the mobile station (step 120). The transceiver selector bank reads a pilot measurement report message transmitted by the mobile station and computes if the FER is less than a threshold value (step 130). The FER is based on the number of error frames and the number of total frames received by a mobile station.

FIG. 2 is a waveform diagram illustrating the forward link transmission (TX) gain of the power transmitted from a base station to a mobile station according to the prior art method for performing forward power control. A base station receiving a pilot measurement report message performs forward power control by adjusting the forward link transmission gain (forward gain) by specific values over specific time intervals, as described below. The base station continues to control power until the next pilot measurement report message is received. Consequently, the actual power control cycle, which is the time interval within which the forward gain of the transmitted power is adjusted corresponding to a single pilot measurement report message, is the time corresponding to one traffic frame. A traffic frame is typically 20 ms in duration. Generally, any change in the forward gain resulting from power control is within the range of ±6 dB of the nominal power.

The base station receives the pilot measurement report message and, beginning at the nominal forward link transmission gain (nominal gain), reduces the forward gain by a value "slow down delta" over a time interval "slow down time". The forward gain is reduced as many times as possible in the "slow down mode" until a "fast down mode" can be entered. That is, the gain-reduction is accelerated by the base station unless the mobile station reports that the quality of the forward link is poor. If the forward link quality is not poor, then the forward gain is reduced by a value "fast down delta" over a time interval "fast down time".

Upon receiving the pilot measurement report message from the mobile station, the base station utilizes the frame error rate contained therein to determine the forward power control. As such, the forward gain is increased up to a value "small up delta" when the frame error rate is less than a predetermined FER threshold, or up to a value "big up delta" when the frame error rate is greater than the predetermined FER threshold. The increasing step of the forward gain is repeated whenever a pilot measurement report message is received.

According to the prior art method for performing forward power control, a base station receives a pilot measurement report message from a mobile station either on a cyclic basis or whenever the number of error frames is greater than a threshold value. When the forward link quality is degenerating due to a change in the radio environment, the forward gain is increased in proportion to the reported FER. Therefore, the reporting cycle of a mobile station has to become short enough to perform the forward power control timely when radio environment dynamically changes.

Generally, satellite and microwave communications systems transmit directly from a sending antenna to a receiving antenna utilizing a direct wave. In contrast, in conventional mobile communication systems, either a reflected, diffracted or scattered wave is utilized. This is due to the very short length of the antenna of the mobile station, which is generally lower than neighboring obstacles such as buildings. Disadvantageously, the use of reflected, diffracted or scattered waves results in reduced signal power and significant interference.

Therefore, the range of power control to be implemented (i.e., change in gain) and the time interval in which such implementation is to occur, should be decided only after thoroughly analyzing the signal intensity change within the frequency band used for power control. Additionally, such range and time interval changes need to be different than those utilized in conventional CDMA and PCS (Personal Communication Services) systems of 800 MHz and 1.3 GHz, respectively. This is because, for example, the power control cycle in a conventional 800 MHz CDMA cellular system is unable to keep up with changes in the actual radio environment. Further, since conventional PCS systems utilize the higher frequency of 1.3 GHz, signal power reduction and signal interference are so severe that the power control cycle should be even shorter that the power control cycle in an 800 MHz CDMA system.

Thus, it would be desirable and highly advantageous for a method to be provided for performing forward power control absent the deficiencies of the prior art method. Some of the deficiencies of the prior art method will now be described. First, as stated above, the prior art method relies on a mobile station to send a pilot measurement report message so that the forward power control can be increased. However, in order to send the message, the mobile station must reduce a reverse link traffic packet by a frame. Since the pilot measurement report message is not used in the actual communication, this process increases the noise in the reverse link. Consequently, it reduces the service quality of the reverse link. Additionally, the excessive transmission of pilot measurement report messages to a base station further reduces the service quality of the reverse link.

This leads to the second deficiency in the prior art method for performing forward power control, the second deficiency being a 4 Hz maximum allowable reporting cycle rate for the mobile station. The maximum allowable cycle rate copes with slow fading. Since the power control cycle rate is unable to keep up with changes in the radio environment, a call may be released in the case of log-normal shadowing resulting from signal blocking by, for example, city skyscrapers.

The third deficiency is that a pilot measurement report message from a mobile station may be missing due to log-normal shadowing. In such a case, the transceiver selector bank does not perform forward power control until the next pilot measurement report message is received.

SUMMARY OF THE INVENTION

It is therefore an object of the present invention to provide forward power control which judges the forward link quality based on an erasure indicator bit contained in a reverse traffic channel frame transmitted from a mobile station.

In one aspect of the invention, a method for performing forward power control in a code division multiple access (CDMA) cellular communication system comprises the steps of: initializing and starting the forward power control; and adjusting a forward link transmission gain of a power transmitted from a base station to a mobile station based on a value of an erasure indicator bit contained in a reverse traffic frame transmitted in a reverse traffic channel from the mobile station.

Preferably, the forward power control is performed by a transceiver selector bank in a base station transceiver subsystem. The forward gain is reduced when the erasure indicator bit equals 0, or is increased when the erasure indicator bit equals 1. The erasure indicator bit is set equal to 0 when the quality of a forward traffic channel is greater than a predefined threshold, or set to 1 when the quality of the forward traffic channel is less than the predefined threshold.

The forward gain is preferably reduced repeatedly by a specified value over a specified time interval, when the erasure indicator bit is equal to 0. However, the forward gain is not further reduced, when the forward gain becomes equal to a predefined minimum forward link transmission gain. Additionally, the forward gain is increased by a first specified value, when the erasure indicator bit is equal to 1 and the forward gain at the present time is less than a nominal forward link transmission gain. The forward gain is increased by a second specified value, when the erasure indicator bit is equal to 1 and the forward gain at the present time is greater than a nominal forward link transmission gain.

These and other objects, features and advantages of the present invention will become apparent from the following detailed description of illustrative embodiments thereof, which is to be read in connection with the accompanying drawings, where the same reference numerals are used to represent the same functional elements.

DETAILED DESCRIPTION OF PREFERRED EMBODIMENTS

Initially, it is to be understood that in order to facilitate a clear understanding, the present invention is described with reference to specific embodiments. However, it is to further understood that the invention is not limited to these specific embodiments and, given the teaching of the invention provided herein, one of ordinary skill in the art will be able to contemplate these and other similar implementations of the elements of the present invention.

Current PCS systems allow calls to be made at a transmission rate of 13 kbps, as well as at the transmission rate of 8 kbps corresponding to existing CDMA systems. In order to provide control signal multiplicity for maintaining voice data and the communication path, a 13 kbps-call service uses a multiplex option 2, while a 8 kbps-call service uses a multiplex option 1.

In a service using multiplex option 2, an erasure indicator bit is included in a frame transmitted between a mobile station and a base station. According to the present invention, an erasure indicator bit is used in performing power control.

The mobile station sets the erasure indicator bit equal to "1" when the quality of the forward traffic channel is poor (i.e., when the number of bad frames is greater than a predefined threshold value). Alternatively, the mobile station sets the erasure indicator bit equal to "0" when the quality of the forward traffic channel is not poor (i.e., when the number of bad frames is less than the predefined threshold). The erasure indicator bit is included in a reverse traffic frame that is transmitted after receiving a forward frame. Upon receiving the reverse traffic frame, the base station determines the forward link quality and immediately performs power control, as required. Thus, the base station performs forward power control whenever it receives a reverse traffic frame.

Forward power control is implemented about every 20 ms, because the duration of a frame in a traffic channel is fixed at about 20 ms. Consequently, the rate of the power control cycle is increased more than twelve-fold, from 4 Hz to 50 Hz.

The increased cycle rate results in a shortened power control cycle and thus, reduced power consumption. Additionally, by not using the pilot measurement report message, the service quality of the reverse link is improved.

Figure 3:
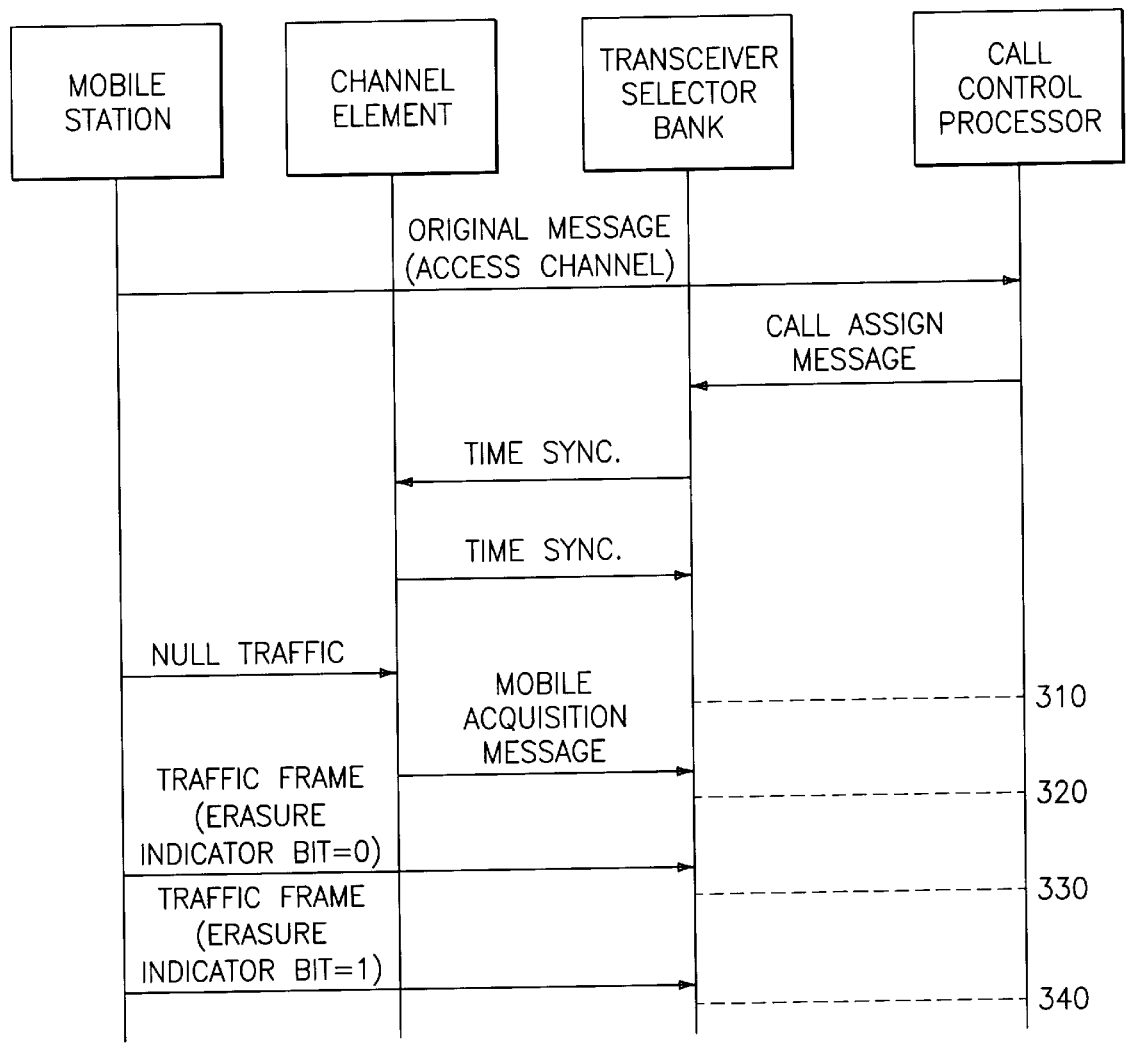
FIG. 3 is a signal flow diagram illustrating a method for performing forward power control according to an embodiment of the present invention.

FIG. 3 is a signal flow diagram illustrating a method for performing forward power control according to the present invention. A mobile station receives and transmits messages to a call control processor through a channel element and a transceiver selector bank.

The call control processor sends a call assign message to the transceiver selector bank, which then prepares to establish a traffic channel by exchanging time synchronization data with the channel element. The mobile station then informs the channel element of the start of the traffic channel by transmitting null traffic to the channel element. Once the traffic channel has started, the transceiver selector bank initializes forward power control (e.g., sets the minimum, nominal, and maximum gain) (step 310).

Upon the arrival of a mobile acquisition message from the channel element, the transceiver selector bank waits for a reverse traffic frame (step 320). The transceiver selector bank receives a reverse traffic frame from the mobile station every 20 ms and divides it into a primary channel, a secondary channel, a control signal and an erasure indicator bit (step 330).

The transceiver selector bank performs forward power control according to the value of the erasure indicator bit separated in the above process. Thus, if the erasure indicator bit equals "0", then the transceiver selector bank decreases the current forward gain by a value "power down delta" over a time interval "power down time" (FIG. 4) "Power down delta" is a unit value used in reducing the forward power. As examples, "power down delta" may be in the range of approximately 0.01 to 0.1 dB, and "power down time" may be in the range of approximately 50 to 60 frames. However, the actual values of "power down delta" and "power down time" are dependent on the quality of the radio environment. The current forward gain is not further reduced when it equals the minimum transmission gain.

The mobile station repeatedly receives a power-controlled signal and transmits a traffic frame. If the service quality of the forward link is poor, then the erasure indicator bit is set equal to "1".

When the erasure indicator bit equals "1", the transceiver selector bank increases the current forward gain (step 340). The current forward gain is increased by a value "big up delta" when the current forward gain is less than the nominal gain, or by a value "small up delta" when the current forward gain is greater than, or equal to, the nominal gain (FIG. 4).

Figure 1:
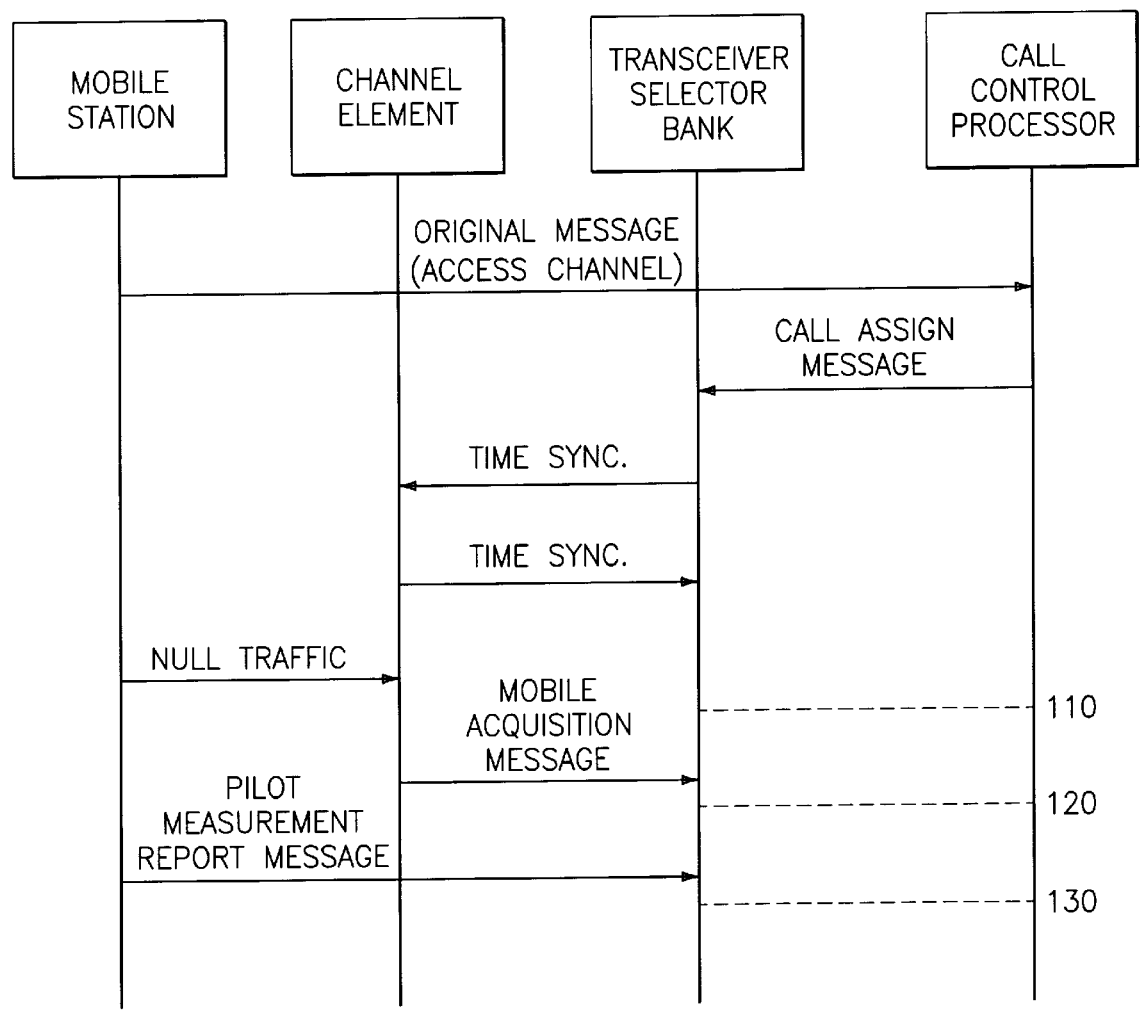
FIG. 1 is a signal flow diagram illustrating a method for performing forward power control according to the prior art.
Figure 2:
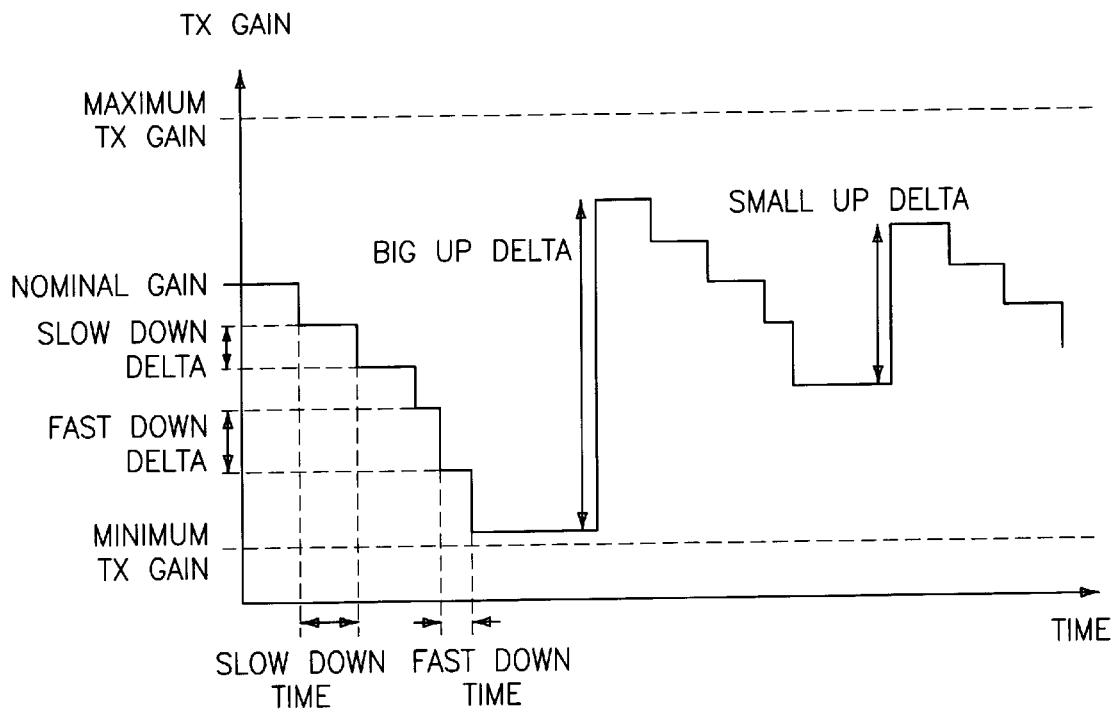
FIG. 2 is a waveform diagram illustrating the forward link transmission gain of the power transmitted from a base station to a mobile station according to the prior art method for performing forward power control.
Figure 4:
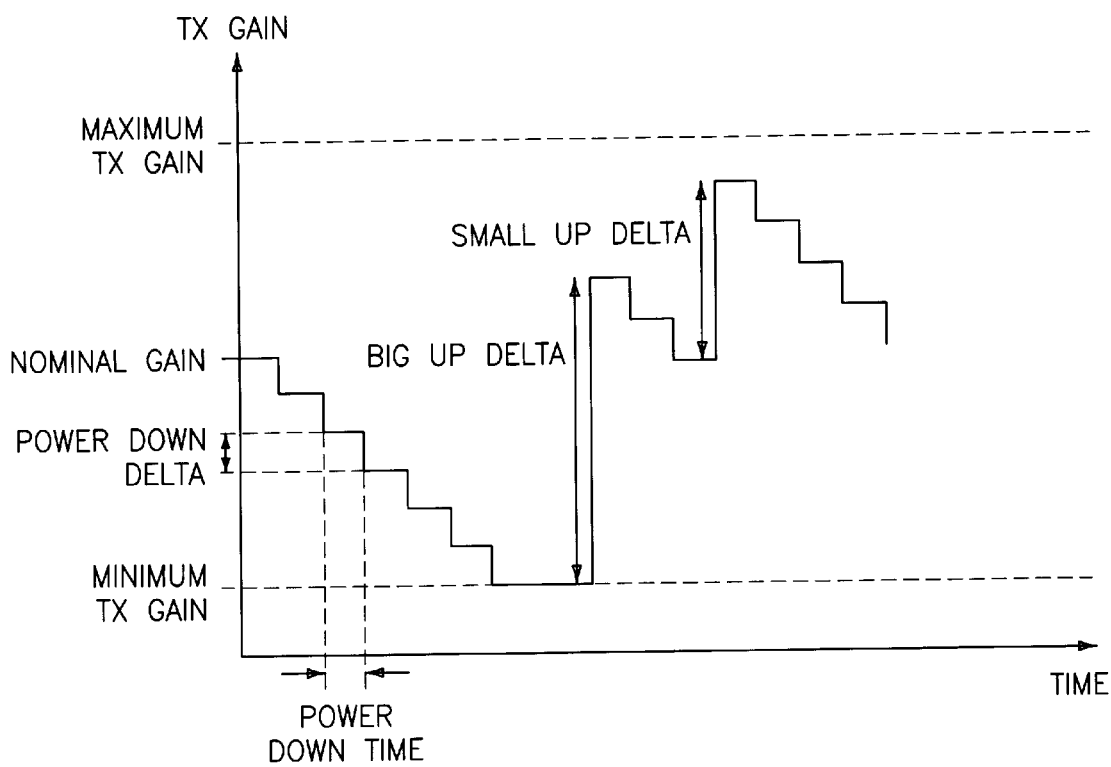
FIG. 4 is a waveform diagram illustrating the forward link transmission gain of the power transmitted from a base station to a mobile station in a method for performing forward power control according to an embodiment of the present invention.

FIG. 4 is a waveform diagram illustrating the forward link transmission gain of the power transmitted from a base station to a mobile station in a method for performing forward power control according to an embodiment of the present invention. Beginning at nominal gain, if the erasure indicator bit equals "0", then the base station repeatedly decreases the forward gain by a value "power down delta" over a time interval "power down time". However, upon reaching the minimum transmission gain, the base station discontinues reducing the forward gain.

If the forward link quality has degenerated due to the reduction of the forward gain, then the mobile station sets an erasure indicator bit in a reverse traffic frame equal to "1" and transmits the reverse traffic frame. The transceiver selector bank then compares the current forward gain with the nominal gain. If the current forward gain is less than the nominal gain, then the current forward gain is increased by a value "big up delta". However, if the current forward gain is greater than, or equal to, the nominal gain, then the current forward gain is increased by a value "small up delta".

FIG. 4 illustrates the forward gain increased by the value "big up delta", when the forward gain is less than the nominal gain. The increase is performed by the transceiver selector bank. Then, the transceiver selector bank repeatedly reduces the forward gain by the value "power down delta".

The method for performing forward power control according to the present invention provides numerous advantages over the prior art method for performing the same. Some of these advantages will now be discussed.

First, the forward power control method of the present invention results in an improvement in the quality of the reverse link. This is achieved by performing the forward power control through the use of an erasure indicator bit instead of a pilot measurement report message.

Second, the forward power control method of the present invention allows the transceiver selector bank to promptly handle rapid changes in the radio environment. This is due to the increased rate of the forward power control cycle, which is over twelve times faster than the prior art cycle rate.

Finally, since the forward power control method of the present invention does not rely on pilot measurement report messages, forward power control may still be performed even when a pilot measurement report message is missing due to, for example, log-normal shadowing.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for performing forward power control in a code division multiple access (CDMA) cellular communication system, comprising the steps of:

initializing and starting the forward power control;

establishing a maximum transmission gain, a minimum transmission gain and a nominal transmission gain, being between the minimum and maximum transmission gains; and adjusting a forward link transmission gain (forward gain) of a power transmitted from a base station to a mobile station based on a value of an erasure indicator bit contained in a reverse traffic frame transmitted in a reverse traffic channel from the mobile station, wherein when the forward gain is between the nominal transmission gain and the maximum transmission gain, upward adjustments to the forward gain are for a first specified value, and when the forward gain is between the minimum transmission gain and the nominal transmission gain, upward adjustments to the forward gain are for a second specified value, the second specified value being greater than the first specified value.

2. The method of claim 1, wherein the forward power control is performed by a transceiver selector bank in a base station transceiver subsystem.

3. The method of claim 2, further comprising the steps of the mobile station receiving and transmitting messages to a call control processor by means of a channel element and a transceiver selector bank.

4. The method of claim 3, further comprising the step of the transceiver selector bank establishing a traffic channel by exchanging time synchronization data with the channel element.

5. The method of claim 2, further comprising the step of the the transceiver selector bank receiving the reverse traffic frame from the mobile station and separating the reverse traffic frame into a primary channel, a secondary channel, a control signal, and an erasure indicator bit, according to a multiplexing option 2.

6. The method of claim 1, wherein the forward gain is reduced when the erasure indicator bit equals 0.

7. The method of claim 6, wherein the forward gain is increased when the erasure indicator bit equals 1.

8. The method of claim 1, wherein the erasure indicator bit is set equal to 0, when the quality of a forward traffic channel is greater than a predefined threshold.

9. The method of claim 8, wherein the forward gain is not further reduced, when the forward gain becomes equal to a predefined minimum forward link transmission gain.

10. The method of claim 1, wherein the erasure indicator bit is set equal to 1, when the quality of a forward traffic channel is less than a predefined threshold.

11. The method of claim 1, wherein the reverse traffic frame containing the erasure indicator bit is transmitted to the base station, after the mobile station has received a forward traffic frame transmitted in a forward traffic channel.

12. The method of claim 1, wherein the forward gain is reduced repeatedly by a specified value over a specified time interval, when the erasure indicator bit is equal to 0.

13. The method of claim 1, wherein the base station performs the forward power control upon receiving the reverse traffic frame.

14. In a CDMA cellular communication system having a plurality of forward channel communications and a plurality of reverse channel communications, a method for performing forward power control, the method comprising the steps of:

initializing an starting the forward power control;

establishing a maximum transmission gain, a minimum transmission gain and a nominal transmission gain, being between the minimum and maximum transmission gains; and reducing a forward line transmission gain (forward gain) of a power transmitted from a base station to a mobile station, when an erasure indicator bit contained in a reverse traffic frame is equal to 0; and increasing the forward gain of the power transmitted from the base station to the mobile station, when the erasure indicator bit contained in the reverse traffic frame is equal to 1, wherein when the forward gain is between the nominal transmission gain and the maximum transmission gain, upward adjustments to the forward gain are for a first specified value, and when the forward gain is between the minimum transmission Gain and the nominal transmission gain, upward adjustments to the forward gain are for a second specified value, the second specified value being greater than the first specified value.

15. The method of claim 14, wherein the erasure indicator bit is set equal to 0, when a number of forward traffic error frames is less than a predefined threshold.

16. The method of claim 14, wherein the erasure indicator bit is set equal to 1, when a number of forward traffic error frames is greater than a predefined threshold.

* * * * *